United States Statutory Invention Registration [19]

[11] Reg. Number: H723

Plichta et al. [43] Published: Jan. 2, 1990

[54] LITHIUM ELECTROCHEMICAL CELL CONTAINING DIETHYLCARBONATE AS AN ELECTROLYTE SOLVENT ADDITIVE

[75] Inventors: Edward J. Plichta, Freehold; Steven M. Slane, Neptune, both of N.J.

[73] Assignee: The United States of America as represented by the Secretary of the Army, Washington, D.C.

[21] Appl. No.: 215,664

[22] Filed: Jul. 6, 1988

[51] Int. Cl.[4] ..... H01M 6/16

[52] U.S. Cl. ..... 429/197; 429/218

[58] Field of Search ..... 429/194, 197

[56] References Cited

U.S. PATENT DOCUMENTS

| | | | |
|---|---|---|---|
| 4,056,663 | 11/1977 | Schlaikjer | 429/197 |
| 4,740,433 | 4/1988 | Lu | 429/194 X |
| 4,751,160 | 6/1988 | Plichta et al. | 429/197 |
| 4,786,499 | 11/1988 | Slane et al. | 429/197 |

*Primary Examiner*—John F. Terapane
*Assistant Examiner*—Daniel S. Metzmaier
*Attorney, Agent, or Firm*—Sheldon Kanars; Roy E. Gordon

[57] ABSTRACT

An electrochemical cell comprising lithium as the anode, the lithium intercalating compound $Li_x CoO_2$ ($O<X<1$) as the cathode, and a solution of a lithium salt in a mixed organic solvent of methylformate and diethylcarbonate as the electrolyte.

5 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

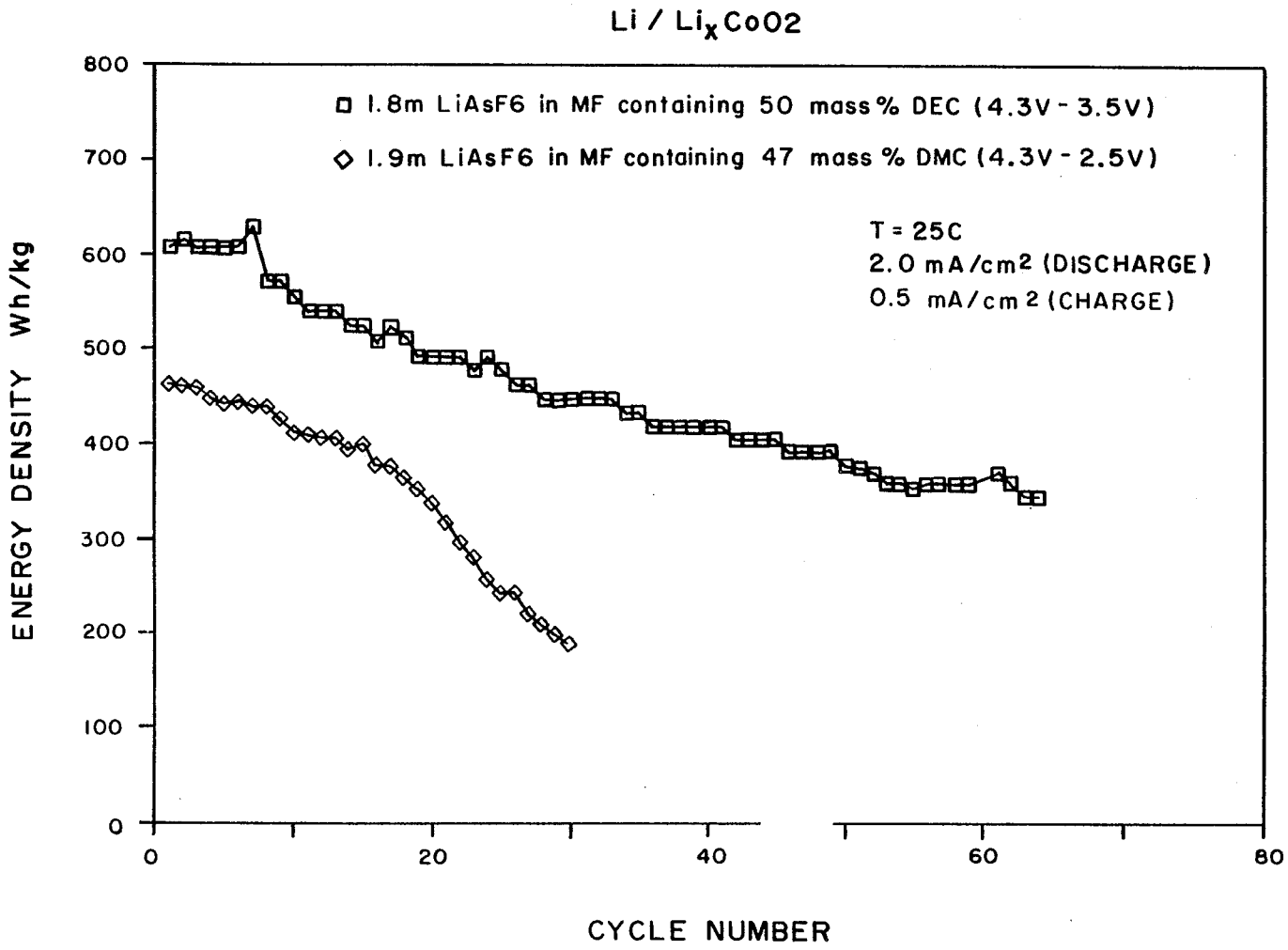
Li / Li$_x$CoO2
□ 1.8m LiAsF6 in MF containing 50 mass % DEC (4.3V - 3.5V)
◇ 1.9m LiAsF6 in MF containing 47 mass % DMC (4.3V - 2.5V)
T = 25C
2.0 mA/cm2 (DISCHARGE)
0.5 mA/cm2 (CHARGE)
ENERGY DENSITY Wh/kg
800
700
600
500
400
300
200
100
0
0
20
40
60
80
CYCLE NUMBER

LITHIUM ELECTROCHEMICAL CELL CONTAINING DIETHYLCARBONATE AS AN ELECTROLYTE SOLVENT ADDITIVE

The invention described herein may be manufactured, used, and licensed by or for the Government for governmental purposes without the payment to us of any royalty thereon.

This invention relates in general to a lithium electrochemical cell and in particular, to a lithium electrochemical cell including lithium as the anode, the lithium intercalating compound $Li_xCoO_2$ ($0<x<1$) as the cathode, and a solution of a lithium salt in a mixed organic solvent of methyl formate (MF) and diethylcarbonate (DEC) as the electrolyte.

BACKGROUND OF THE INVENTION

This application is copending with U.S. patent application Ser. No. 125,642, filed Nov. 1, 1987, now U.S. Pat. No. 4,786,499 for "Lithium Electrochemical Cell Including Aprotic Solvent-Dialkyl Carbonate Solvent Mixture" and assigned to a common assignee. In that application, there is described and claimed a lithium electrochemical cell including lithium as the anode, non-stoichiometric (NS)-$V_6O_{13}$ as the cathode, and a solution of a lithium salt in a mixed organic solvent of methyl formate and diethylcarbonate as the electrolyte.

Another lithium intercalating compound, to wit, $Li_xCoO_2$ ($0<x<1$) is particularly attractive for battery applications because of its inherently high energy content. However, the known $Li_xCoO_2$ cathode material/solvent combinations are susceptible to oxidation during charge and reduction during discharge that results in losses in cell capacity and cycle-life. In addition to oxidation and reduction of the electrolyte, both the cathode and anode are subject to reaction with the solvent and electrolyte. This can result in poor lithium cyclability and structural rearrangement of the active material which may limit rechargeability.

SUMMARY OF THE INVENTION

The general object of this invention is to provide an improved lithium electrochemical cell including $Li_xCoO_2$ ($0<x<1$) as the cathode active material. A more particular object of the invention is to provide an intercalating solvent system for $Li_xCoO_2$ ($0<x<1$) that produces higher energy lithium cells also characterized by increased resistance to solvent oxidation and improved lithium cycling efficiencies.

It has now been found that the aforementioned objects can be attained by employing a system including lithium as the anode, $Li_xCoO_2$ ($0<x<1$) as the cathode, and a solution of a lithium salt in a mixed organic solvent of MF and DEC as the electrolyte.

The solution can be, for example, 1 to 2 mol $dm^{-3}$ $LiAsF_6$ in the mixed organic solvent. Though the use of $LiAsF_6$ as the electrolyte salt is preferred, other electrolyte salts can be used such as the soluble salts of light metals, for example, tetrafluoroborates, tetrachloroaluminates, perchlorates, hexafluorophosphates, and halides of lithium.

The mass percent of the DEC in the mixed organic solvent can vary from 10 to 100 mass percent. The instant invention identifies and demonstrates that the addition of DEC to ester containing electrolytes, such as $LiAsF_6$ in MF, results in significant improvements in the electrolytes resistance to electrochemical oxidation and improved lithium cycling efficiencies. In addition, when these electrolytes containing the DEC additives are used in $Li/Li_xCoO_2$ electrochemical cells, there is significant improvements in the cell cycling behavior over cells without the DEC additive.

DESCRIPTION OF THE DRAWING AND THE PREFERRED EMBODIMENT

The drawing compares cycling results obtained for additions of DEC and dimethylcarbonate (DMC) to $LiAsF_6$ in MF electrolyte in a $Li/Li_xCoO_2$ electrochemical cell.

The drawing shows the dramatic improvement in cycling behavior for the electrolyte containing DEC as opposed to DMC. The $Li/Li_xCoO_2$ cells are cycled between either 4.3 V to 3.5 V or 4.3 V to 2.5 V where the charging rate is 0.5 $mAcm^2$, the discharge rate is 2 0 $mAcm^2$, and the temperature is 25° C. The $Li_xCoO_2$ cathodes include a mixture of 80 weight percent $Li_xCoO_2$, 10 weight percent carbon diluent, and 10 weight percent Teflon binder. The cathode mixture is roll pressed onto aluminum substrates and sintered in a vacuum oven at 280° C. for 1 hour. The cycling is performed on identically prepared cells consisting of flag electrodes sealed in a glass pressure vessel where Celgard 2400 is used as separators and a glass fiber wick for drawing electrolyte in between the electrode.

Interestingly, homologues of DEC such as DMC have been utilized in lithium cells and are known to be sufficiently stable towards lithium. However, although DMC and DEC show structural similarities, they behave very differently in the presence of lithium, both chemically and electrochemically. DMC produces a high cycling efficiency of 80 percent as compared to DEC which is 0 percent. This is due to the reactive nature of DEC with lithium as opposed to the more stable DMC solvent. However, even though DMC is more stable with lithium, its addition to the $LiAsF_6$-MF electrolyte does not result in the improved results observed with DEC. Therefore, where the successful use of DMC as a solvent in lithium cells may imply the possible use of a similar solvent such as DEC, this is not made obvious due to the lack of lithium stability of the neat DEC electrolyte, thus precluding such applications. Furthermore, one would not find obvious the discovery that a mixture of the unstable solvent DEC with another solvent would produce an improved mixture suitably stable for use in a lithium cell. It is only through its addition to other ester electrolytes that the use of DEC in lithium cells is possible.

The use of DEC as a solvent additive in electrolytes for use in either primary, rechargeable, or reserve electrochemical cells is not considered to be limited to the instance where lithium is the anode. That is, other light metals or composites may be applicable as the anode such as sodium, potassium and aluminum, or any conductively doped polymeric material or similar compound. Moreover, the positive electrode or cathode, may be any oxide, sulfide or combinations of titanium, vanadium, chromium, manganese, iron, cobalt, nickel, copper, zinc, zirconium, niobium, molybdenum, hafnium, tantalum, or tungsten or any conductively doped polymeric material or similar compound.

We wish it to be understood that we do not desire to be limited to the exact details as described for obvious modifications will occur to a person skilled in the art.

What is claimed is:

1. An electrochemical cell comprising lithium as the anode, the lithium intercalating compound $Li_xCoO_2$ ($0<x<1$) as the cathode, and a solution of a lithium salt in a mixed organic solvent of methylformate and diethylcarbonate as the electrolyte.

2. An electrochemical cell according to claim 1 wherein the mass percent of the diethylcarbonate in the mixed organic solvent of methylformate and diethylcarbonate can vary from about 10 to 100 mass percent in the electrolyte.

3. An electrochemical cell according to claim 2 wherein the solution of lithium salt is 1–2 mol $dm^{-3}$ $LiAsF_6$ in methylformate.

4. An electrochemical cell according to claim 1 wherein the $Li_xCoO_2$ cathode consists of a mixture of about 80 weight percent $Li_xCoO_2$, about 10 weight percent carbon diluent and about 10 weight percent Teflon binder roll pressed onto aluminum substrates and sintered in a vacuum oven at 280° C. for 1 hour.

5. An electrochemical cell according to claim 4 wherein the mass percent of the diethylcarbonate in the mixed organic solvent of methylformate and diethylcarbonate can vary from about 10 to 100 mass percent in the electrolyte and wherein the solution of lithium salt is 1–2 mol $dm^{-3}$ $LiAsF_6$ in methylformate.

* * * * *